United States Patent
Wheeler et al.

(10) Patent No.: US 6,839,933 B2
(45) Date of Patent: Jan. 11, 2005

(54) FLUID SUPPLY TANK FOR HAND HELD VACUUM

(75) Inventors: David K. Wheeler, Gananoque (CA); Christopher J. Murray, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 235 days.

(21) Appl. No.: 10/175,519

(22) Filed: Jun. 19, 2002

(65) Prior Publication Data

US 2003/0233728 A1 Dec. 25, 2003

(51) Int. Cl.⁷ .............................. A47L 5/24; A47L 11/30
(52) U.S. Cl. .............................. 15/320; 15/344; 392/404
(58) Field of Search ............ 15/320, 344; 392/402–406

(56) References Cited

U.S. PATENT DOCUMENTS

| | | |
|---|---|---|
| 2,020,120 A | 11/1935 | Leathers |
| 2,617,138 A | 11/1952 | Brown, Sr. et al. |
| 3,040,362 A | 6/1962 | Krammes |
| 3,245,160 A | 4/1966 | Knapp |
| 3,604,037 A | 9/1971 | Varner |
| 3,675,449 A | 7/1972 | Bluestein |
| RE27,792 E | 10/1973 | Howerin et al. |
| D231,658 S | 5/1974 | Stauft |
| 3,869,749 A | 3/1975 | London et al. |
| 3,940,826 A | 3/1976 | Phillips et al. |
| 3,949,499 A | 4/1976 | Schaeffer et al. |
| 4,046,989 A | 9/1977 | Parise et al. |
| 4,327,459 A | 5/1982 | Gilbert |
| 4,397,057 A | 8/1983 | Harbeck |
| 4,536,914 A | 8/1985 | Levine |
| 4,583,260 A | 4/1986 | Zai |
| D289,576 S | 4/1987 | Okada et al. |
| 4,656,763 A | 4/1987 | Kawasaki et al. |
| 4,788,769 A | 12/1988 | Maruyama |
| 4,821,366 A | 4/1989 | Levine |
| 4,831,685 A | 5/1989 | Bosyj et al. |
| RE33,074 E | 10/1989 | Levine |
| 4,896,396 A | 1/1990 | Giannelli |
| 4,920,608 A | 5/1990 | Hult et al. |
| 4,928,347 A | 5/1990 | Krasznai et al. |
| D313,831 S | 1/1991 | Gildersleeve |
| 5,020,187 A | 6/1991 | Kosten et al. |
| 5,065,473 A | 11/1991 | Krasznai et al. |
| D333,891 S | 3/1993 | Reed, Jr. et al. |
| 5,289,610 A | 3/1994 | Monson |
| 5,341,541 A | 8/1994 | Sham |
| D352,807 S | 11/1994 | Sanderud |
| 5,367,740 A | 11/1994 | McCray |

(List continued on next page.)

FOREIGN PATENT DOCUMENTS

| JP | 2-191498 A | 7/1990 |
|---|---|---|

OTHER PUBLICATIONS

Black & Decker Home Products Catalog; 1999; 6 pages.

*Primary Examiner*—Terrence R. Till
(74) *Attorney, Agent, or Firm*—Harness, Dickey & Pierce, P.L.C.

(57) ABSTRACT

A hand held vacuum using fluid, such as steam, to enhance cleaning is provided. The hand held vacuum includes a main body housing having a vacuum inlet and at least one fluid discharge aperture. The vacuum inlet cooperates with a vacuum fan and the fluid discharge aperture cooperates with a pump mechanism. A fluid supply tank is adapted to be removably connected to the main body housing and has a fill opening. A closure is removably attached to the fluid supply tank and is adapted to seal the fill opening and provide a discharge flow path. A flow path extension provides fluid communication between a low point in the fluid supply tank and the discharge flow path of the closure. The flow path extension may be rigid. The discharge flow path of the closure may extend between a radial inlet and an axial outlet of the closure.

30 Claims, 5 Drawing Sheets

U.S. PATENT DOCUMENTS

| | | |
|---|---|---|
| 5,383,251 A | 1/1995 | Whitaker et al. |
| D357,772 S | 4/1995 | Yuen |
| 5,473,792 A | 12/1995 | Kent et al. |
| 5,500,977 A | 3/1996 | McAllise et al. |
| 5,507,068 A | 4/1996 | Fan et al. |
| 5,680,810 A | 10/1997 | Sham |
| 5,692,315 A | 12/1997 | Sham |
| 5,784,753 A | 7/1998 | Kaczmarz et al. |
| 5,784,755 A | 7/1998 | Karr et al. |
| 5,794,303 A | 8/1998 | Sanfilippo et al. |
| 5,819,364 A | 10/1998 | Sham |
| 5,839,159 A | 11/1998 | Karr et al. |
| 5,865,104 A | 2/1999 | Sham et al. |
| 5,896,617 A | 4/1999 | Kasen et al. |
| 5,958,113 A | 9/1999 | Collins et al. |
| 5,970,572 A | 10/1999 | Thomas |
| 6,031,969 A | 2/2000 | Burr et al. |
| D425,270 S | 5/2000 | Zahuranec |
| D430,365 S | 8/2000 | Roberts et al. |
| 6,100,502 A | 8/2000 | Sham et al. |
| 6,125,498 A | 10/2000 | Roberts et al. |
| 6,148,144 A | 11/2000 | Milanese |
| 6,189,178 B1 | 2/2001 | Roberts |
| 6,212,332 B1 | 4/2001 | Sham et al. |
| D441,508 S | 5/2001 | Doria |
| D445,974 S | 7/2001 | Stratford |
| 6,289,551 B1 | 9/2001 | Basile |
| 6,314,972 B1 | 11/2001 | Sin |
| 6,571,421 B1 * | 6/2003 | Sham et al. ............... 15/320 |
| 2001/0039684 A1 | 11/2001 | Kasper et al. |
| 2003/0106180 A1 * | 6/2003 | Tsen ......................... 15/321 |

* cited by examiner

FLUID SUPPLY TANK FOR HAND HELD VACUUM

FIELD OF THE INVENTION

The present invention relates to hand held vacuums; and more particularly, to such hand held vacuums which use a fluid to enhance cleaning.

BACKGROUND OF THE INVENTION

Hand held vacuums with fluid supply tanks are known in the art. In many cases, the fluid supply tank is not removable. This can make refilling the fluid supply tank inconvenient. For example, where water is used to fill the tank, the elongated nature of hand held vacuums can prevent them from being filled in a typical kitchen sink. Thus, the user may be required to use a bathtub for filling the tank. Alternatively, the fluid tank may be filled via a hose or by filling a smaller container that is then emptied into the fluid supply tank. Thus, convenience is compromised.

In cases where the fluid tank is removable, the location of the discharge flow path, and often the fill opening, has generally been limited to a low point of the fluid tank during use. This can unnecessarily limit attachment options of the tank to the vacuum and the overall functional and aesthetic configuration of the hand held vacuum. For example, this typically results in a generally horizontal interface between the tank and the vacuum housing.

SUMMARY OF THE INVENTION

The present invention provides a hand held vacuum which uses a fluid to enhance cleaning. The hand held vacuum includes a main body housing having a vacuum inlet and at least one fluid discharge aperture associated with the main body housing. The vacuum inlet has a vacuum fan associated therewith and the fluid discharge aperture has a pump mechanism associated therewith. Also included is a fluid supply tank adapted to be removably connected to the main body housing. The fluid supply tank has a fill opening. A closure is removably attached to the fluid supply tank. The closure is adapted to seal the fill opening and provide a discharge flow path.

In one aspect of the present invention a flow path extension is attached to the fluid supply tank. In addition, the flow path extension of the fluid supply tank is adapted to provide fluid communication between a low point in the fluid supply tank and the discharge flow path of the closure.

In another aspect of the present invention a flow path extension is provided which is rigid. In addition, the rigid flow path extension is adapted to provide fluid communication from a low point in the fluid supply tank to the discharge flow path of the closure.

In yet another aspect of the present invention the discharge flow path of the closure extends between a radial inlet of the closure and an axial outlet of the closure. In addition, a flow path extension is adapted to provide fluid communication between a low point in the fluid supply tank and the discharge flow path of the closure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For example, although the invention is discussed herein in terms of a hand held steam vacuum, it could also be used, e.g., with other fluids which enhance cleaning.

Figure 1:
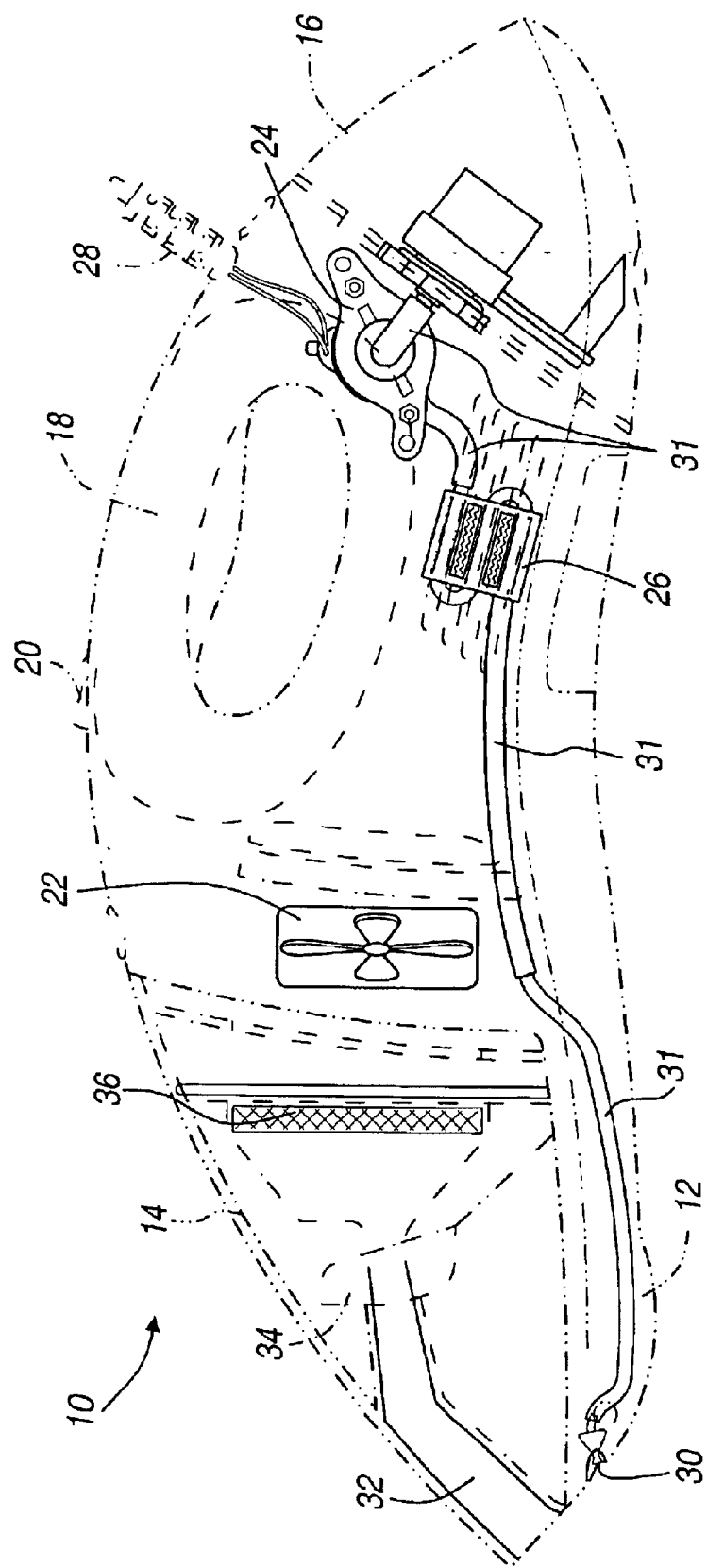
FIG. 1 is a perspective illustration of various of the major components of a preferred hand held vacuum of the present invention.

Referring to FIG. 1, a preferred embodiment of a hand held steam vacuum, generally indicated as 10, is illustrated. Hand held steam vacuum 10 generally includes a main body housing 12 to which a collection bowl 14 and a fluid supply tank 16 is removably attached. Housing 12 includes a handle 18 for carrying and manipulating hand held steam vacuum 10. Internal to the housing 12 is a fan 22, a pump mechanism 24, a heating mechanism 26, all operatively electrically connected to power supply cord 28 and switch 20, fluid is pumped by the pump mechanism 24 from the fluid supply tank 16 through the heating mechanism 26 and out through discharge apertures 30 via fluid transport tubes 31. Heating mechanism 26 is adapted to heat the fluid flowing from the discharge flow path 47 (seen best in FIG. 5) to the fluid discharge apertures 30 to turn at least a portion into steam.

The debris collection bowl 14 is removably attached to the housing 12 and includes a vacuum inlet 32, a deflector 34, and a filter mechanism 36. A fan 22 sucks air, fluid and debris into collection bowl 14 through vacuum inlet 32. These incoming materials impact upon deflector 34 which generally separates the fluid and debris from the air which passes through the filter mechanism 36 and out of the housing 12.

Figure 2:
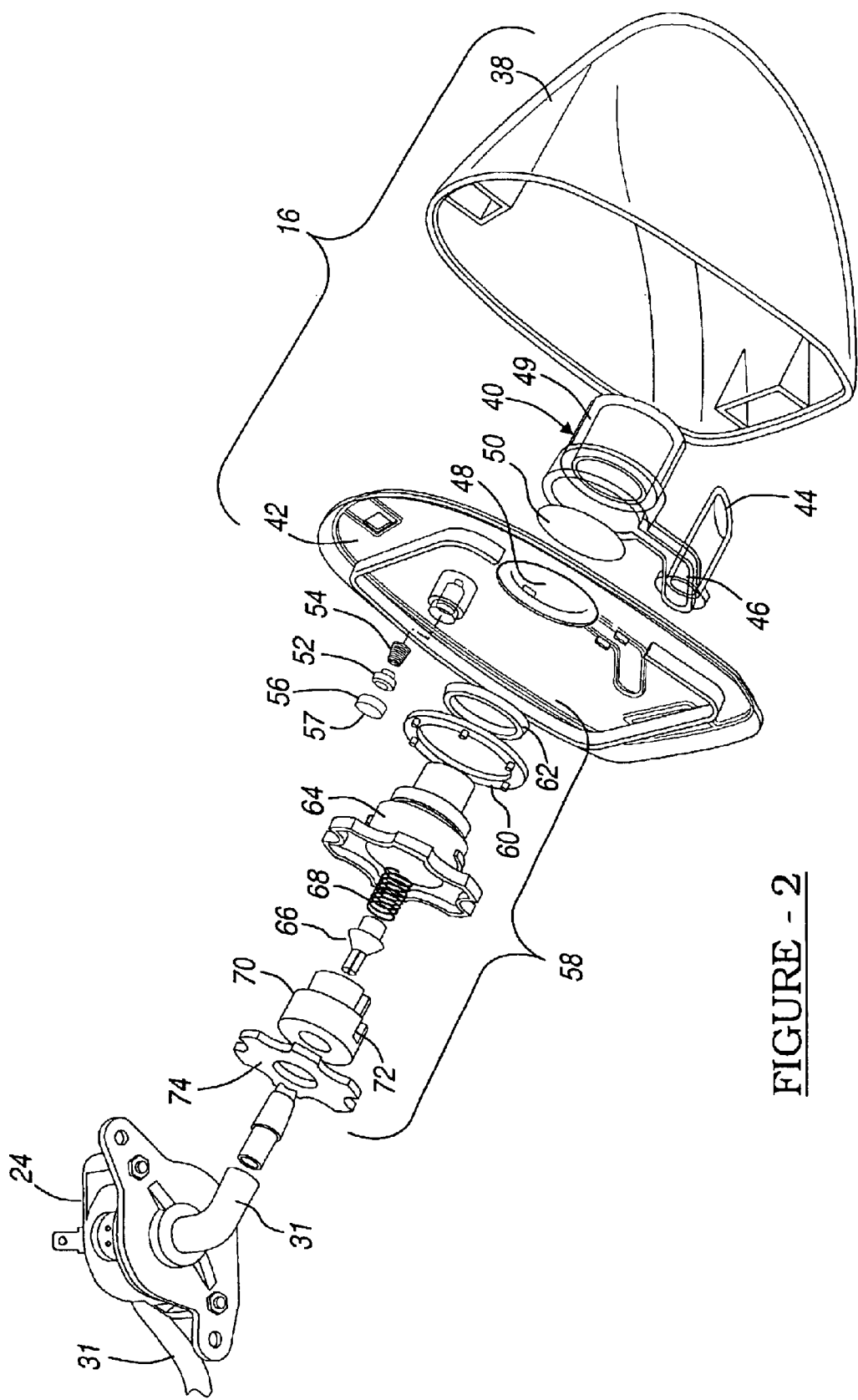
FIG. 2 is an exploded perspective view of a fluid supply tank of the vacuum.

Referring to FIG. 2, fluid supply tank 16 generally includes a container member 38, an internal rigid member of 40, and a lid member 42. Internal rigid member 40 is fixedly attached to the inside surface of lid member 42. Thus, a fluid passage is provided from a distal end 44 of a rigid flow path extension 46 to a point adjacent the fill opening 48 of the fluid supply tank 16. Internal rigid member 40 includes a main, generally internal cylindrical wall 49 having a larger diameter portion and a smaller diameter portion. A screen 50 is attached near the distal end of the internal cylindrical wall 49 to keep foreign objects from entering the fluid supply tank 16 upon filling. Thus screen 50 provides filter mechanism adapted to filter fluid as it enters fluid supply tank 16. Screen 50 is preferably formed of a plastic or metal grid.

Lid member 42 includes an air venting mechanism associated therewith. The air venting mechanism includes a valve member 52, a biasing member 54 and a cover 56 which includes a vent aperture 57 therethrough. Thus, air is permitted to enter the fluid supply tank 16 as the internal pressure of fluid supply tank 16 decreases due to fluid being pumped therefrom.

With continuing reference to FIG. 2, the various components of a closure 58 are also illustrated. Two gaskets 60 and 62 for sealing between cooperating components of closure 58 and the fluid supply tank 16 are preferably retained on the closure housing 64. Located inside closure housing 64 is a valve mechanism 65, including a valve member 66, a biasing member 68 associated therewith and a seal member 70. Also located inside the closure housing 64 is a seal member 70 against which a valve member 66 seats and seals. Seal member 70 is preferably made of silicone rubber. Seal member 70 includes a recess 72 which operates as both an orientation mechanism and a portion of a discharge flow path 47 as described below. These internal components 66, 68, 70 are retained within closure housing 64 by a closure lid 74.

Figure 3:
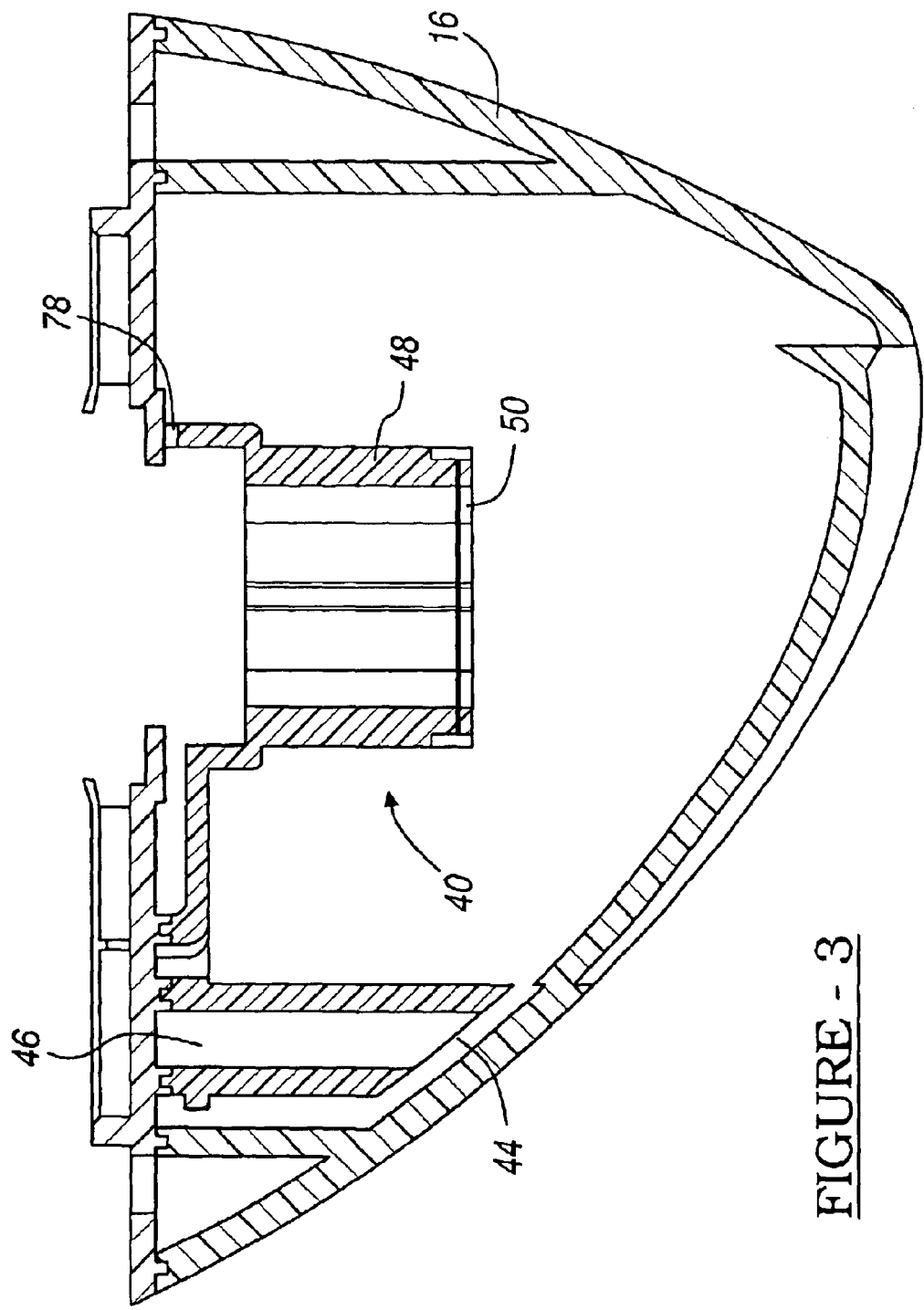
FIG. 3 is a cross sectional view of the fluid supply tank in its assembled form.

Referring to FIG. 3, fluid supply tank 16 is illustrated in its assembled form. Fill opening 48 has a relatively large diameter allowing for easy filling of fluid supply tank 16. As the fluid enters the fluid supply tank 16 through fill opening 48, it is filtered by screen 50 located at the distal end of internal cylindrical wall 49 which keeps foreign objects out which might otherwise damage the pump mechanism 24. Once the fluid level reaches the distal end of the internal cylindrical wall 49, an air lock is prevented by vent opening 78 at the upper end of internal cylindrical wall 49 during filling of tank 16. Thus, fluid may continue to enter fluid supply tank 16 due to air being permitted to escape through vent opening 78; allowing fluid supply tank 16 to be completely filled. As illustrated herein, the flow path extension 46 is formed of a component attached to the wall which is lid member 42 of the fluid supply tank 16. Thus, the lid member 42 wall of the fluid supply tank 16 provides a portion of the enclosure.

Figure 4:
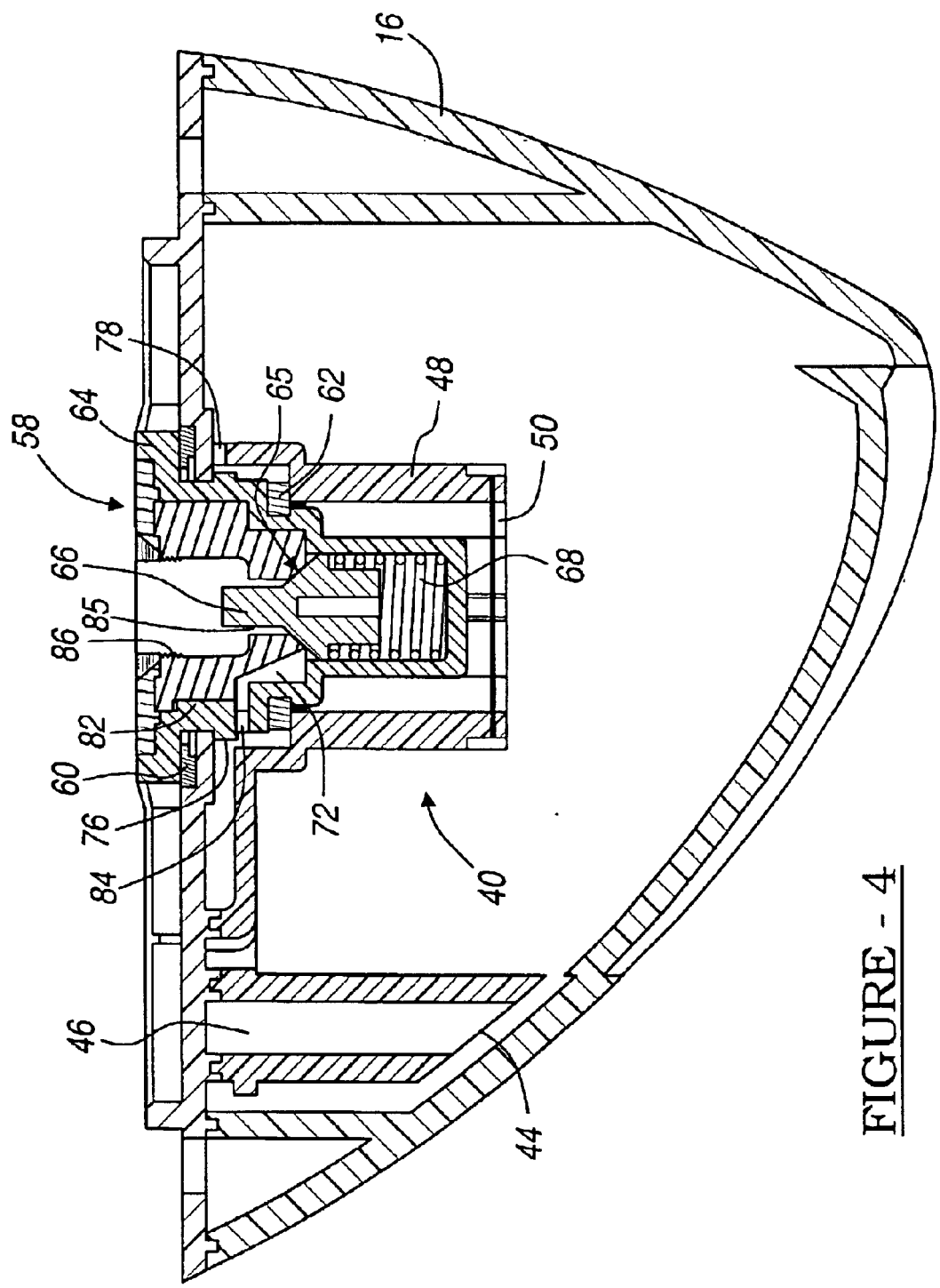
FIG. 4 is a cross sectional view similar to FIG. 3, but including the closure in place selectively sealing the fill opening and the fluid discharge path.

Referring to FIG. 4, closure 58 is shown in its assembled form and attached to the fluid supply tank 16. Closure 58 is removably attached to the fluid supply tank 16 by threads 76. An inner gasket 62 provides a seal between closure housing 64 and the shoulder portion of internal cylindrical wall 49 of internal rigid member 40. An outer gasket 60 provides a seal the between closure housing 64 and lid member 42 of a fluid supply tank 16. Together, the seals enable fluid to be sucked through the flow path extension 46. Thus, closure 58 is adapted to seal fill opening 48 and provide a discharge flow path 47. As used herein, closure 58 is considered to "seal" fill opening 48 even if the discharge flow path 47 remained open. For example, if the discharge flow path 47 did not include a valve mechanism 65 to selectively seal it.

An elongated rib 82 located on the inner wall of closure housing 64 operates as an alignment mechanism for seal member 70 in cooperation with the upper segment of recess 72. This alignment mechanism operates to align radial inlet 84 with the lower segment of recess 72 to provide a portion of the discharge flow path 47. In this closed position, the discharge flow path 47 provided by recess 72 is sealed as a result of valve member 66 being biased against a frustroconical surface of seal member 70 by biasing member 68. Thus, closure 58 includes a closed position in which the fluid discharge passage 46, 84, 72 is sealed. In addition, closure 58 seals the large diameter fill opening 48. With the valve mechanism 65 in the closed position, fluid is not permitted to enter or leave the fluid supply tank 16.

As illustrated, it is preferred that closure 58 be located substantially within the outer walls of fluid supply tank 16 when closure 58 is attached thereto. Such a configuration minimizes the overall dimensions of fluid supply tank 16. This also simplifies the connections between housing 12 and flow path extension 46. As used herein, a closure 58 is located substantially within the outer walls of fluid supply tank 16 if it extends less than fifty percent of the axial length of the closure outside the outermost point of fluid supply tank (excluding any extending wall around fill opening to which closure 58 is attached). Preferably, closure extends less than twenty-five percent of the axial length of the closure outside the outermost point of fluid supply tank (excluding any extending wall around fill opening to which closure 58 is attached); and more preferably, less than about fifteen percent.

Figure 5:
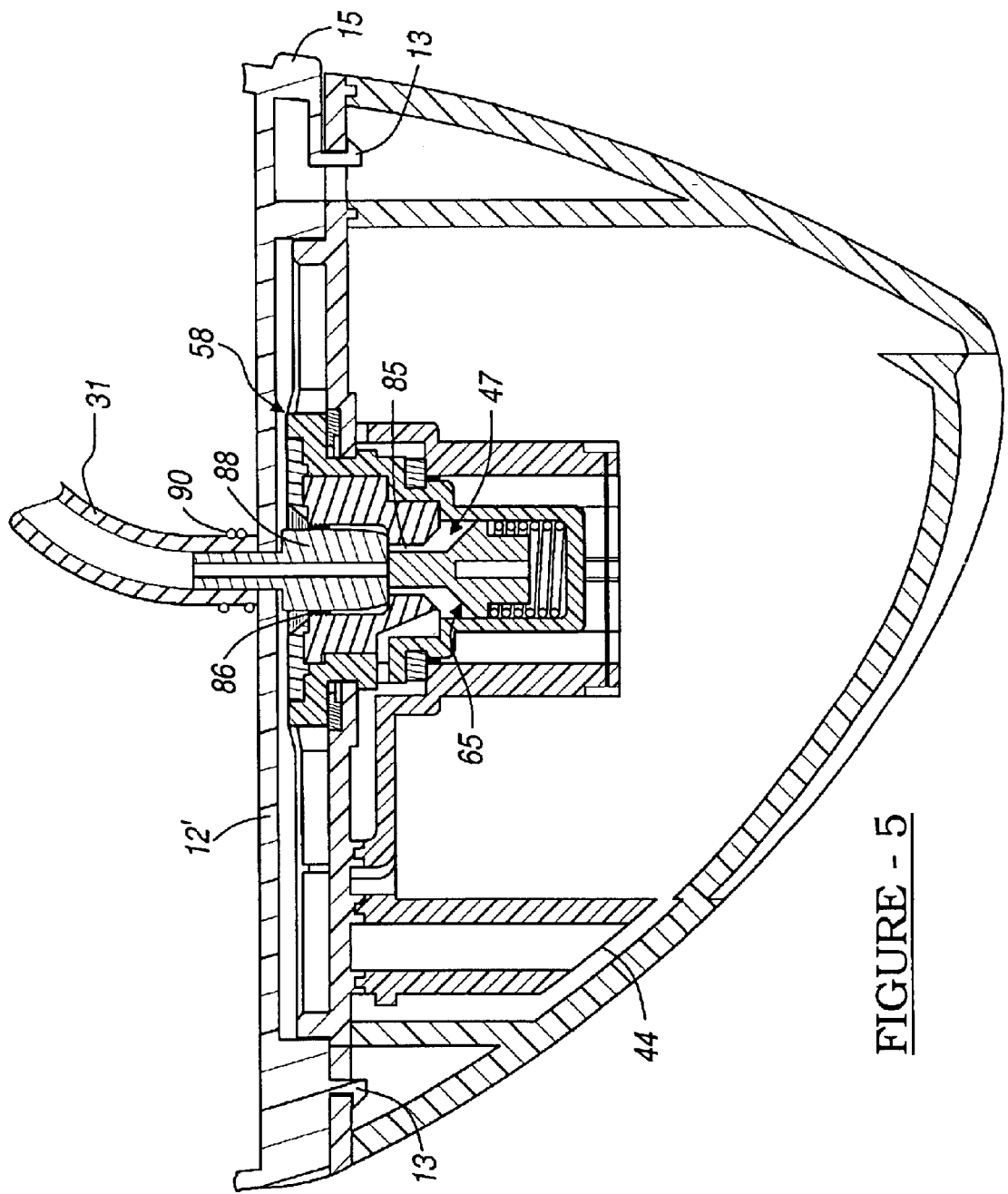
FIG. 5 is a cross-sectional view similar to FIG. 4, but with the tank attached to the vacuum housing and the valve of the fluid discharge path opened.

Referring to FIG. 5, the fluid supply tank 16 is illustrated attached to the housing 12 of the hand held vacuum 10. The housing includes mating wall 12' which includes upper and lower locking tabs 13 and 15. The upper locking tab 13 is cantilevered from the mating wall 12' and includes a pushbutton 15 which when manually pressed releases fluid supply tank 16 from the housing 12. Thus, the fluid supply tank 16 is removably connected to main body housing 12 and may be selectively located in position attached to the housing 12 or in an unattached position.

Attached to mating wall 12' is fluid transport tube 31 and coupling member 88 which are retained together by compression banding 90. As fluid supply tank 16 is attached to housing 12, coupling member 88 protrudes into closure 58. Fins 86 provide a fluid tight connection between coupling member 88 and seal member 70. As coupling member 88 continues to protrude into closure 58, it contacts valve member 66 and opens the valve mechanism 65 against the force of biasing member 68. Thus, the valve mechanism 65 of the fluid discharge flow path 46, 84, 72 is moved into an open position. Thus, attachment of fluid supply tank 16 to main body housing 12 causes coupling member 88 to move the valve mechanism 65 into an open position.

The distal end 44 of the rigid flow path extension 46 is located in the area which is a low point within the fluid supply tank 16 during normal operation of the hand held steam on vacuum 10. Under influence of pump mechanism 24, fluid is a sucked from the distal end of the flow path extension 46 to radial inlet 84. Next, fluid passes through the discharge flow path 47 which extends between radial inlet 84 and axial outlet 85 via the bottom segment of recess 72 and past valve mechanism 65. Coupling member 88 located in axial outlet 85 relieves fluid exiting discharge flow path 47 of closure 58 and transfers fluid to pump mechanism 24 via fluid transport tube 31. Radial inlet 84 and axial outlet 85 of closure 58 is preferred. This configuration offers several potential advantages. For example, it allows flow path extension 46 to remain attached to fluid supply tank 16 when closure 58 is removed from fluid supply tank 16. Thus, the flow path extension 46 is not required to dangle from closure 58, or be located in the path of incoming fluid through fill opening 48.

Similarly, as illustrated, it is preferred that the flow path extension includes a segment adjacent closure 58 which is not coincident with the central axis of the closure. More preferably, this adjacent segment extends generally orthogonally to the central axis. As used herein, a segment of the flow path extension is "adjacent" the closure if it is within about fifty percent of the overall flow path length provided by the flow path extension. Preferably, the adjacent segment is within about twenty-five percent of the overall flow path length provided by the flow path extension; more preferably, within about ten percent and even more preferably, the adjacent segment is the segment immediately adjacent closure 58.

As used herein, the term "central axis" is not limited to circular closures, but is intended to encompass the axis passing through the center line of closure 58 in the direction between the exterior of fluid supply tank 16 and the interior of tank 16. Also as used herein, "generally orthogonally" is intended to encompass all directions within 45 degrees of an orthogonal plane relative to the central axis. Preferably, the adjacent segment extends in a direction which is within about 25 degrees of an orthogonal plane relative to the central axis; more preferably within about fifteen degrees; even more preferably, in a direction which about coincides with an orthogonal plane relative to the central axis.

Under influence of pump mechanism 24, the fluid then passes through fluid transport tubes 31 to heating mechanism 26. When switch 20 is in the steam position, heating mechanism 26 converts substantially all the fluid being supplied by pump mechanism 24 to a vapor. Switch 20 may also be located in a fluid position wherein at least a meaningful portion of the fluid is not converted to a vapor by heating mechanism 26. The vapor and/or fluid next passes through fluid transport tubes 31 and through discharge apertures 30 where it contacts the surface to be cleaned. As discussed above, debris including the fluid discharged from the hand held vacuum 10 is sucked into the debris collection bowl 14 through vacuum inlet 32 by fan 22.

The description provided above is related to the illustrated preferred embodiment. Of course, many alternative embodiments are possible without departing from the scope of the invention. For example, a preferred alternative vent mechanism (including vent opening 78 at the top of the internal cylindrical wall 49) includes providing the internal cylindrical wall 49 and screen 50 with a single convex screen element extending into the container in place of the internal cylindrical wall 49 and screen 50. Thus, the convex screen element of this embodiment provides both the filter mechanism and the vent mechanism.

Another preferred alternative embodiment provides a screen over the distal end 44 of the flow path extension. This alternative eliminates the need for extending cylindrical wall 49 down into the interior of the fluid supply tank 16.

In another alternative preferred embodiment, coupling member 88 is a simple protrusion that opens the valve mechanism 65. Thus, the coupling member of this alternative embodiment does not include any portion of the fluid flow path therethrough.

In yet another alternative preferred embodiment, the valve mechanism 65 is oriented in the opposite direction. Thus, the valve mechanism 65 opens merely by the pump mechanism 24 providing suction which, in this alternative configuration, pulls inverted valve member 66 away from inverted seal member 70 against the biasing force of spring 68.

In another alternative preferred embodiment, the flow path extension 46 includes a single component tube which completely encloses the flow path. This alternative single component flow path extension is optionally attached directly to a wall of the fluid supply tank. As another option, the single component flow path extension is attached to the wall indirectly, via another component.

Of course many other embodiments may be envisioned by those skilled in the art. For example, the illustrated pump mechanism 24 can alternatively be replaced with a manual pump device. For example, a manual pump device may be associated with the switch 20 of the hand held vacuum 10 for pumping by a thumb of the user.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hand held vacuum which uses a fluid to enhance cleaning comprising:

a main body housing having a vacuum inlet and at least one fluid discharge aperture associated therewith, the vacuum inlet having a vacuum fan associated therewith and the fluid discharge aperture having a pump mechanism associated therewith;

a fluid supply tank adapted to be removably connected to the main body housing, the fluid supply tank having a fill opening;

a closure removably attached to the fluid supply tank; the closure being adapted to seal the fill opening and provide a discharge flow path; and a flow path extension attached to the fluid supply tank wherein the flow path extension of the fluid supply tank is adapted to provide fluid communication between a low point in the fluid supply tank and the discharge flow path of the closure.

2. A hand held vacuum according to claim 1, further comprising a heating mechanism adapted to heat at least a portion of the fluid flowing from the discharge flow path to the fluid discharge aperture into steam.

3. A hand held vacuum according to claim 2, wherein the flow path extension is attached to a wall having the fill opening therein.

4. A hand held vacuum according to claim 2, wherein the closure further comprises a valve mechanism having an open position permitting fluid to pass through the discharge flow path and a closed position in which the discharge flow path of the closure is sealed closed.

5. A hand held vacuum according to claim 1, wherein the flow path extension is attached to a wall having the fill opening therein.

6. A hand held vacuum according to claim 5, wherein the flow path extension further comprises a component attached to a wall of the fluid supply tank to form a flow path between the component and the wall.

7. A hand held vacuum according to claim 1, wherein the closure further comprises a valve mechanism having an open position permitting fluid to pass through the discharge flow path and a closed position in which the discharge flow path of the closure is sealed closed.

8. A hand held vacuum according to claim 7, further comprising a coupling member associated with housing, wherein the valve mechanism is biased toward the closed position, and wherein attachment of the fluid supply tank to the housing causes the coupling member to move the valve mechanism into the open position.

9. A hand held vacuum according to claim 1, wherein the closure is located substantially completely within the outer wall of the fluid supply tank.

10. A hand held vacuum according to claim 1, further comprising an internal wall surrounding the fill opening and extending into the fluid supply tank, a filter mechanism associated with the internal wall adapted to filter fluid as it fills the fluid supply tank; and a vent mechanism associated with the internal wall adapted to permit the fluid supply tank to be filled above a distal end of the internal wall.

11. A hand held vacuum which uses a fluid to enhance cleaning comprising:

a main body housing having a vacuum inlet and at least one fluid discharge aperture associated therewith, the vacuum inlet having a vacuum fan associated therewith and the fluid discharge aperture having a pump mechanism associated therewith;

a fluid supply tank adapted to be removably connected to the main body housing, the fluid supply tank having a fill opening;

a closure removably attached to the fluid supply tank to seal the fill opening, the closure having a discharge flow path; and a rigid flow path extension adapted to provide fluid communication from a low point in the fluid supply tank to the discharge flow path of the closure.

12. A hand held vacuum according to claim 11, further comprising a heating mechanism adapted to heat at least a portion of the fluid flowing from the discharge flow path to the fluid discharge aperture into steam.

13. A hand held vacuum according to claim 12, wherein the rigid flow path extension is attached to a wall having the fill opening therein.

14. A hand held vacuum according to claim 12, wherein the closure further comprises a valve mechanism having an open position permitting fluid to pass through the discharge flow path and a closed position in which the discharge flow path of the closure is sealed closed.

15. A hand held vacuum according to claim 11, wherein the rigid flow path extension is attached to a wall having the fill opening therein.

16. A hand held vacuum according to claim 15, wherein the rigid flow path extension further comprises a rigid component attached to a wall of the fluid supply tank to form a flow path between the component and the wall.

17. A hand held vacuum according to claim 11, wherein the closure further comprises a valve mechanism having an open position permitting fluid to pass through the discharge flow path and a closed position in which the discharge flow path of the closure is sealed closed.

18. A hand held vacuum according to claim 17, further comprising a coupling member associated with housing, wherein the valve mechanism is biased toward the closed position, and wherein attachment of the fluid supply tank to the housing causes the coupling member to move the valve mechanism into the open position.

19. A hand held vacuum according to claim 11, wherein the closure is located substantially completely within the outer wall of the fluid supply tank.

20. A hand held vacuum according to claim 11, further comprising an internal wall surrounding the fill opening and extending into the fluid supply tank, a filter mechanism associated with the internal wall adapted to filter fluid as it fills the fluid supply tank; and a vent mechanism associated with the internal wall adapted to permit the fluid supply tank to be filled above a distal end of the internal wall.

21. A hand held vacuum which uses a fluid to enhance cleaning comprising:

a main body housing having a vacuum inlet and at least one fluid discharge aperture associated therewith, the vacuum inlet having a vacuum fan associated therewith and the fluid discharge aperture having a pump mechanism associated therewith;

a fluid supply tank adapted to be removably connected to the main body housing, the fluid supply tank having a fill opening;

a closure removably attached to the fluid supply tank adapted to seal the fill opening and provide a discharge flow path, the discharge flow path extending between a radial inlet of the closure and an axial outlet of the closure; and a flow path extension adapted to provide fluid communication between a low point in the fluid supply tank and the inlet of the discharge flow path.

22. A hand held vacuum according to claim 21, further comprising a heating mechanism adapted to heat at least a portion of the fluid flowing from the discharge flow path to the fluid discharge aperture into steam.

23. A hand held vacuum according to claim 22, wherein said flow path extension is comprised of at least one rigid component.

24. A hand held vacuum according to claim 22, wherein said flow path extension is attached to the fluid supply tank.

25. A hand held vacuum according to claim 22, wherein the closure further comprises a valve mechanism having an open position permitting fluid to pass through the discharge flow path and a closed position in which the discharge flow path of the closure is sealed closed.

26. A hand held vacuum according to claim 21, wherein the flow path extension further comprises a segment adjacent the closure which extends along an axis which is not coincident with the central axis.

27. A hand held vacuum according to claim 26, wherein the segment adjacent the closure extends generally orthogonal to the direction of the central axis.

28. A hand held vacuum according to claim 21, wherein the closure further comprises a valve mechanism having an open position permitting fluid to pass through the discharge flow path and a closed position in which the discharge flow path of the closure is sealed closed.

29. A hand held vacuum according to claim 21, wherein the closure is located substantially completely within the outer wall of the fluid supply tank.

30. A hand held vacuum according to claim 21, further comprising an internal wall surrounding the fill opening and extending into the fluid supply tank, a filter mechanism associated with the internal wall adapted to filter fluid as it fills the fluid supply tank; and a vent mechanism associated with the internal wall adapted to permit the fluid supply tank to be filled above a distal end of the internal wall.

* * * * *